United States Patent [19]

Southerland

[11] 4,406,916
[45] Sep. 27, 1983

[54] ADAPTOR FOR ROUTING FLAT RIBBON CABLES

[75] Inventor: Stephen R. Southerland, Plano, Tex.

[73] Assignee: Rockwell International Corporation, El Segundo, Calif.

[21] Appl. No.: 332,035

[22] Filed: Dec. 18, 1981

[51] Int. Cl.³ .............................................. H02G 3/00
[52] U.S. Cl. .................................. 174/135; 174/71 R
[58] Field of Search .............................. 174/71 R, 135

[56] References Cited

U.S. PATENT DOCUMENTS 4,192,965 3/1980 Baum .................................. 174/135

FOREIGN PATENT DOCUMENTS 1225779 3/1971 United Kingdom ................ 174/135

Primary Examiner—Laramie E. Askin
Attorney, Agent, or Firm—Roger N. Chauza; V. Lawrence Sewell; Howard R. Greenberg

[57] ABSTRACT

An angle adaptor for use in effecting coplanar routing schemes with flat ribbon cables. A unitary planar guide member around which the flat ribbon cable is folded in a desired routing angle employs hingeable arms to secure the ribbon cable to the guide member near the edges where the ribbon cable approaches and exits the member. The edge around which the ribbon cable is folded is cross-sectionally configured to eliminate sharp creases in the cable and thereby minimize cable conductor stress.

11 Claims, 3 Drawing Figures

ADAPTOR FOR ROUTING FLAT RIBBON CABLES

BACKGROUND OF THE INVENTION

The present invention pertains generally to flat ribbon cables and more particularly to an adaptor for effecting a coplanar angular routing of a multiconductor flat ribbon cable.

The advance in the electronic computer industry, along with the miniaturization of electronic circuitry, has had the effect of modularizing electronic functions. In an electronic system environment employing modular functions there remains a need to effect communications between the modules. The multiconductor flat ribbon cable is well adapted to fill this need insofar as an entire cable may be assembled and installed in minutes without utilizing conventional wire harnesses, tie-downs, wire wrap or solder connections.

However, the flat ribbon cable is not without the attendant disadvantage of being cumbersome to route in directions coplanar to the cable. It is a conventional practice to simply overlap the cable on itself to effect a desired routing scheme and tie or clip the cable to adjacent framework. The disadvantage with this method is that a permanent cable route is accomplished by sharply bending or creasing the cable and the embedded conductors. This routing technique produces a serious strain in both the cable and conductor materials.

Another approach for routing and retaining flat ribbon cables is disclosed in U.S. Pat. No. 4,192,965 entitled "Flat Ribbon Cable Retainer". Such a scheme, however, suffers from the disadvantage that the retainer itself is comprised of a complicated bulky structure thereby rendering the manufacture thereof difficult and expensive. Moreover, the flat cable must still be subjected to sharp creases.

With the foregoing in mind, it is a primary object of the present invention to provide an angle adaptor for use in routing a flat ribbon cable without the necessity of subjecting the cable to sharp creases.

It is yet another object of the present invention to provide an angle adaptor around which a flat ribbon cable is folded rather than being enclosed within.

It is a further object of the present invention to provide a compact, one-piece easily manufacturable angle adaptor to facilitate the routing of a flat ribbon cable.

The foregoing objects, as well as others, and the means by which they are achieved through the present invention, may best be appreciated by referring to the Detailed Description of the Invention which follows hereinafter together with the appended drawings.

SUMMARY OF THE INVENTION

In accordance with the stated objects, a generally planar guide member is employed as a mechanism around which a flat ribbon cable is obliquely folded so as to effect a coplanar change of cable direction. At the guide member edges where the cable respectively approaches and exits the member, there are provided means for securing the ribbon cable to the member thereby fixing a permanent angular cable route. Importantly, the edge around which the ribbon cable is folded is comprised of a cross-sectional shape which precludes the formation of a sharp crease in the cable.

The securing means are comprised of arms formed as extensions of the guide member, the joining of the arms to the guide member being accomplished by "living hinges". A snap closure arrangement is utilized to lock each arm to the guide member and secure the ribbon cable therebetween.

In the preferred embodiment, the guide member and the securing means are molded as a unitary device out of a nonconductive plastic material. The simplicity of the adaptor is characterized by the fact that the device is well adapted for low cost high volume applications.

DETAILED DESCRIPTION OF THE INVENTION

Figure 1:
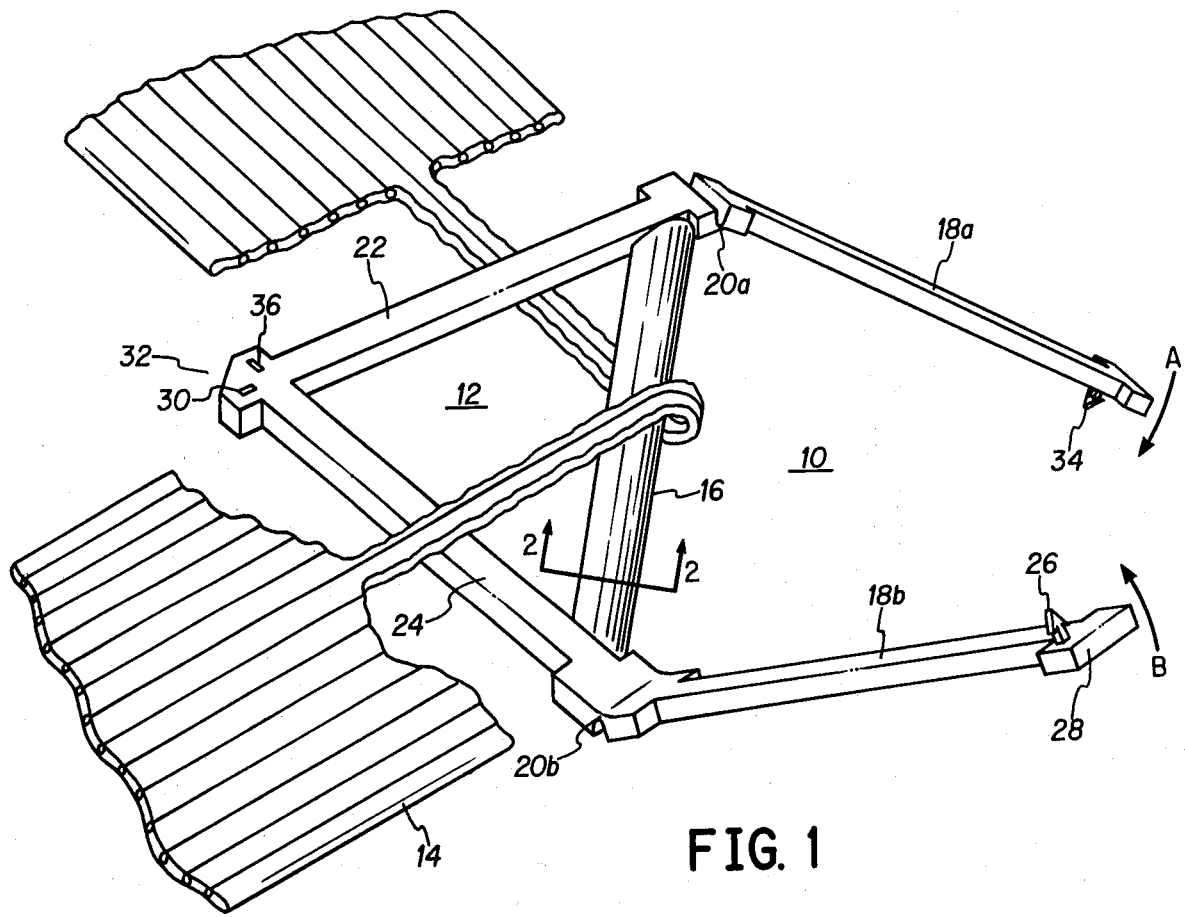
FIG. 1 is an isometric view of the preferred embodiment of the invention.

Turning now to FIG. 1, there is shown the preferred embodiment of an adaptor, generally designated 10, constructed in accordance with the invention. The adaptor 10 includes a guide member 12 for routing a coplanar change of direction of flat multiconductor ribbon cable 14 by obliquely folding the cable therearound without sharp creasing. For clarity, the ribbon cable 14 is shown in fragmentary form as it is routed around the guide member 12. More particularly, the cable is routed along the top side of the guide member 12, then around its oblique edge 16 and then along the guide member bottom side. The present invention further includes a pair of hinged arms 18a, 18b movable to a closed position to hold the ribbon cable to the respective top and bottom sides. A detailed discussion of the manner in which the cable is secured to the adaptor follows later.

With reference now to the construction of the adaptor, it should be noted that it is molded into a one-piece planar structure out of a resilient type of plastic material. The parameters chiefly governing the type of plastic which may be used are those which enable a thin portion thereof to be flexed many times without creating a fracture within the material i.e. a living hinge. One type of plastic found to be suitable is polypropylene.

The adaptor geometrical configuration of FIG. 1 is particularly well adapted for ninety degree coplanar changes in flexible cable orientations. The installation of the triangular shaped adaptor on a flat ribbon cable can be quickly accomplished by directing the flat ribbon cable 14 so that it approaches proximate the guide member edge 24, is folded around oblique edge 16, and exits proximate the guide member edge 22. It should be observed that the ribbon cable 14 overlaps the guide member 12 on the top side thereof, and underlaps the guide member on its bottom side.

For securing the cable to the adaptor, each arm 18a, 18b is integrally hinged to the guide member 12 by the respective living hinges 20a and 20b. Living hinge 20a is on the bottom side of the adaptor, and arm 18a pivots downwardly (arrow A) and then against the bottom side of the guide member edge 22 to secure cable 14 therebetween. Living hinge 20b is on the top side of the adaptor and arm 18b piviots upwardly (arrow B) and then against the top side of guide member edge 24 to secure the cable 14 therebetween.

Figure 2:
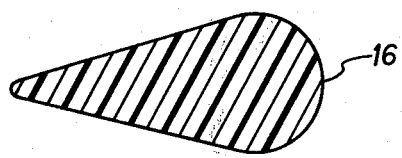
FIG. 2 is an enlarged cross-sectional view of FIG. 1 taken along line 2—2.

In accordance with an object of the invention, and referring briefly to FIG. 2, there is shown a cross-section of the guide member edge 16 around which the ribbon cable 14 is folded. This view is enlarged to emphasize the cross-sectional configuration wherein the outer corners are rounded to reduce ribbon cable fatigue and stress by eliminating sharp creases or folds therein. It should be appreciated that the ribbon cable is not folded upon itself, as is conventionally done, but rather is folded around the guide member edge 16. Additionally, the elimination of sharp creases in ribbon cables allows the cable to be restraightened with little harm to the cable or its appearance, should the adaptor device be repositioned to a different location on the ribbon cable. Of course, other folding edge configurations may be equally effective in eliminating sharp creases in the cable.

The present invention includes a detent arrangement, in the form of a snap closure, to lock the free end of each arm to the guide member. Referring back to FIG. 1, arrowhead male element 26, integrally formed on arm end 28, is inserted through aperture 30 in guide member corner 32. Release is effected by squeezing together the arrowhead tabs and pushing the arrowhead back through the aperture. Arm 18a is comparably locked to the guide member corner 32 along edge 22 by arrowhead 34 and aperture 36. Other locking arrangements may of course be used.

Figure 3:
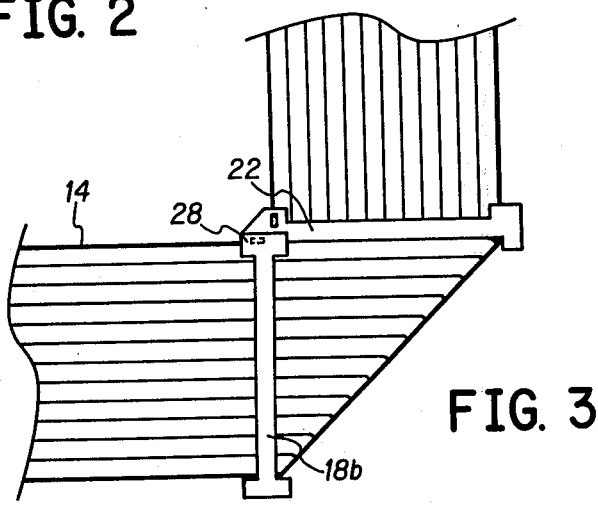
FIG. 3 is a plan view of the adaptor device as installed on a flat ribbon cable to form a ninety degree change of direction routing.

Referring now to FIG. 3 there is shown the adaptor as installed on a flat ribbon cable 14. It should be noted that the triangular geometry of the guide member 12, according to the preferred embodiment, primarily determines the angle in which the ribbon cable will be routed. A typical ribbon cable coplanar routing scheme can be accomplished generally with the use of ninety degree angles. Accordingly, an isoceles right triangular configuration provides for such a ninety degree change of cable routing. Viewing FIG. 1 in conjunction with FIG. 3, it may be understood that the guide member equal-length edges 22, 24 and the hypotenuse edge 16 form the geometrical isoceles right triangle configuration.

Assuming that the ribbon cable 14 approaches guide member edge 24 orthogonally, it follows that the angular orientation between such edge and the hypotenuse edge 16 determines the routing angle of the cable. Other triangular configurations may be chosen to achieve other ribbon cable angular routing schemes.

Adaptor 10 may additionally be formed with auxillary snap tabs and/or apertures or the like (not shown) for attaching an adaptor to an equipment frame, or for stacking a plurality of adaptors.

In summary, the present invention provides a simple to manufacture, simple to install vehicle for routing flat ribbon cables. The disclosed adaptor is an advance in the art insofar as it is generally planar and small, thus requiring less space when installed on flat ribbon cables.

The specific embodiment disclosed herein is intended to be exemplary of the principles of the present invention and not restrictive thereof since various modifications, readily apparent to those familiar with the art, may be made without departing from the spirit and scope of the invention as claimed hereinbelow.

What I claim is:

1. An adaptor for routing a coplanar change of direction of flat multiconductor ribbon cable by obliquely folding the cable without sharp creasing, comprising:
    a guide member for having a cable routed along a top side thereof, then around an oblique edge and then along a bottom side thereof and including a pair of hinged arms movable to a closed position to be capable of holding such a cable against respective said top and bottom sides.

2. The adaptor as set forth in claim 1 wherein each said hinged arm is integrally hinged to said guide member by a living hinge.

3. An adaptor for routing a flat ribbon cable in the plane of said cable, comprising:
    a planar guide member, having a first edge toward which a cable can approach proximate thereto, a second edge, oblique to said first edge, around which such a cable can be folded and then directed proximate to a third edge where said cable can exit said guide member, the angular orientation between said first and second edges thereby being capable of effecting a desired planar routing of such a cable;
    a plurality of arms, each hinged to said guide member, for securing a routed cable between the guide member and each arm when each arm is hingeably disposed toward said guide member; and
    snap closure means for locking each arm to said guide member so as to maintain a routed cable secured to said guide member.

4. The adaptor as set forth in claim 3 wherein said plurality of arms and said snap closure means include a first arm associated with a first snap closure means, and a second arm associated with different snap closure means, said first and second arms and associated snap closure means being disposed on said guide member so as to permit securing a routed cable to said guide member near said first and third edges respectively.

5. The adaptor as set forth in claim 4 wherein said first arm is hinged such that it can secure a routed cable near one said first or third edge on one side of said guide member, and said second arm is hinged such that it can secure said cable near the other said first or third edge on the other side of said guide member.

6. The adaptor as set forth in claim 3 wherein said second edge is comprised of a cross-sectional configuration wherein the outer corners thereof are rounded so that cable conductor stress, due to said folding, is minimized.

7. The adaptor as set forth in claim 3 wherein the planar geometrical configuration of said guide member is generally that of an isoceles right triangle, the second edge around which a cable can be folded being the hypotenuse of the isoceles right triangle, whereby a 90 degree routing in the plane of a folded cable is effected.

8. A one-piece planar adaptor for routing a coplanar change of direction of multiconductor flat ribbon cable by obliquely folding the cable therearound without sharp creasing, comprising:
    a planar guide member having an isoceles right-triangle shape and constructed of a non-conductive plastic, the hypotenuse edge of said guide member having rounded external corners, said planar guide member thereby being adapted to have a ribbon cable overlapped on one side of said guide member then folded obliquely around the hypotenuse edge thereof and then underlapped on the other side thereof so that overlapped and underlapped sections of a ribbon cable can respectively approach and exit proximate the equal-length guide member edges;
    two arms, each joined to said guide member by a living hinge so that each arm is moveable toward a different side of said guide member to secure therebetween either an overlapped or underlapped section of a cable;

snap closure means for locking the end of each arm to the side of the guide member to which said arm is moveable.

9. The planar adaptor as set forth in claim 8 wherein said snap closure means is comprised of an arrowhead male element and an aperture into which said arrowhead male element is snapped.

10. The planar adaptor as set forth in claim 9 wherein one said arrowhead male element is integrally formed on each arm end and two said apertures are located within said guide member.

11. The planar adaptor as set forth in claim 10 wherein both said apertures are located in the guide member corner where said equal-length edges intersect.

* * * * *